United States Patent
Lee et al.

(10) Patent No.: US 7,486,340 B2
(45) Date of Patent: Feb. 3, 2009

(54) DISPLAY APPARATUS

(75) Inventors: You-sub Lee, Kunpo (KR); Sang-hak Kim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 729 days.

(21) Appl. No.: 10/806,213

(22) Filed: Mar. 23, 2004

(65) Prior Publication Data

US 2004/0189880 A1    Sep. 30, 2004

(30) Foreign Application Priority Data

Mar. 28, 2003    (KR)    ............ 10-2003-0019404

(51) Int. Cl.
*H04N 5/64*    (2006.01)
(52) U.S. Cl. ........................................ 348/843
(58) Field of Classification Search ............. 348/836, 348/839, 843, 789, 552, 553, 725, 731
See application file for complete search history.

(56) References Cited

U.S. PATENT DOCUMENTS

| | | | |
|---|---|---|---|
| 5,549,038 A | 8/1996 | Kolvites | |
| 5,949,493 A * | 9/1999 | Mudra et al. | 348/553 |
| 5,968,402 A | 10/1999 | Lee | |
| 6,256,075 B1 * | 7/2001 | Yang | 348/843 |
| 7,221,410 B2 * | 5/2007 | Choi et al. | 348/725 |
| 2002/0171774 A1 * | 11/2002 | Lee | 348/731 |
| 2002/0186329 A1 * | 12/2002 | Tong et al. | 348/839 |

FOREIGN PATENT DOCUMENTS

| | | |
|---|---|---|
| JP | 7-210095 | 8/1995 |
| JP | 7-210096 | 8/1995 |
| JP | 10-117081 | 5/1998 |
| JP | 11-272182 | 10/1999 |
| JP | 2000-148031 | 5/2000 |
| JP | 2000-20046 | 7/2000 |
| JP | 2001-92386 | 4/2001 |
| KR | 1998-7500 | 3/1998 |
| KR | 2000-11033 | 6/2000 |
| KR | 2000-88836 | 11/2002 |
| KR | 2002-86844 | 11/2002 |

* cited by examiner

*Primary Examiner*—Paulos M Natnael
(74) *Attorney, Agent, or Firm*—Staas & Halsey LLP

(57) ABSTRACT

A display apparatus having a base board in which a tuner-mounted video board and various circuit components are electrically connected, and a back case, connected to the base board and protecting the video board and the circuit components, wherein the back case has: a main case covering the electronic circuit components; and a sub-case detachably connected to the main case, mounted with the video board, and blocking electromagnetic interference between the video board and the electronic circuit components. With this configuration, the present invention provides a display apparatus with a high quality of a picture image, that prevents a sustain noise by blocking electromagnetic interference between the video board and electric circuit components. The present invention also provides convenient access for after-sale maintenance and upgrade of the video board and the electric circuit components.

15 Claims, 4 Drawing Sheets

DISPLAY APPARATUS

CROSS-REFERENCE TO RELATED APPLICATIONS

This application claims the benefit of Korean Patent Application No. 2003-19404, filed Mar. 28, 2003, in the Korean Intellectual Property Office, the disclosure of which is incorporated herein by reference.

BACKGROUND OF THE INVENTION

1. Field of the Invention

The present invention relates to a display apparatus, and more particularly, to a display apparatus having a video board separately installed from various electronic circuits components, thereby preventing electromagnetic interference.

2. Description of the Related Art

A display apparatus indicates, in general, provides for visualizing data. An LCD (Liquid Crystal Display), a flat panel display device, has been expanding its range of utility in the field of computers, as well as television (TV). A video board for image-handling is required, along with other peripheral devices, to display multimedia data in a computer as well as a TV.

As illustrated in FIG. 1, a conventional display apparatus comprises a video board 2 (such as a tuner-mounted video board), a main board 6 where the video board 2 and various electronic circuit components 4 are electrically connected, and a cover 8, covering the main board 6 and protecting the video board 2 and the electronic circuit components 4. In this conventional display apparatus, however, the various electric circuit components and boards of the main board, such as the tuner-mounted video board 2 and a signal board, are installed close to each other without a barrier or a shield equipped between them, thereby causing a sustain noise. Consequently, the display apparatus has a limit to actualizing a high quality image.

A shield case having a built-in type video board to break electromagnetic interference (EMI) has been disclosed in Korean Patent Application No. 2000-6632, but it has a problem that a display apparatus to which the shield case is combined has complicated components and structures, and does not provide convenient after-sale maintenance, because a case covering a backside of the apparatus needs to be disassembled if a problem occurs on the video board or the electric circuit components.

SUMMARY OF THE INVENTION

Accordingly, it is an aspect of the present invention to provide a display apparatus in which a tuner-mounted video board and electronic circuit components are separately installed, thereby breaking electromagnetic interference.

Additional aspects and/or advantages of the invention will be set forth in part in the description which follows and, in part, will be obvious from the description, or may be learned by practice of the invention.

The foregoing and/or other aspects of the present invention are achieved by providing a display apparatus comprising a base board in which a tuner-mounted video board and various electronic circuit components are electrically connected; and a back case connected to the base board and protecting the video board and the circuit components, the back case including a main case covering the electronic circuit components, and a sub-case detachably connected to the main case, mounted with the video board, and blocking electromagnetic interference between the video board and the electronic circuit components.

According to an aspect of the invention, the sub-case comprises: a shield plate combined with the main case and blocking electromagnetic interference between the video board and the electronic circuit components; and a bracket terminal combined to the shield plate, preventing electromagnetic waves from the video board from leaking out.

According to an aspect of the invention, the main case is provided with a docking area with which the sub-case is detachably combined.

According to an aspect of the invention, the sub-case comprises a stand connection part to, which a stand is connected, allowing the sub-case to be detached from the main case, and remain in connection with the stand.

According to an aspect of the invention, the main case is provided with a selectively opened docking area, with which the sub-case is detachably combined.

According to an aspect of the invention, the sub-case further comprises a stand connection part, to which a stand is connected, allowing the sub-case to be detached from the docking area, and remain in connection with the stand.

According to an aspect of the invention, the sub-case is connected to the main case to not protrude from a rear of the main case.

BRIEF DESCRIPTION OF THE DRAWINGS

These and/or other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
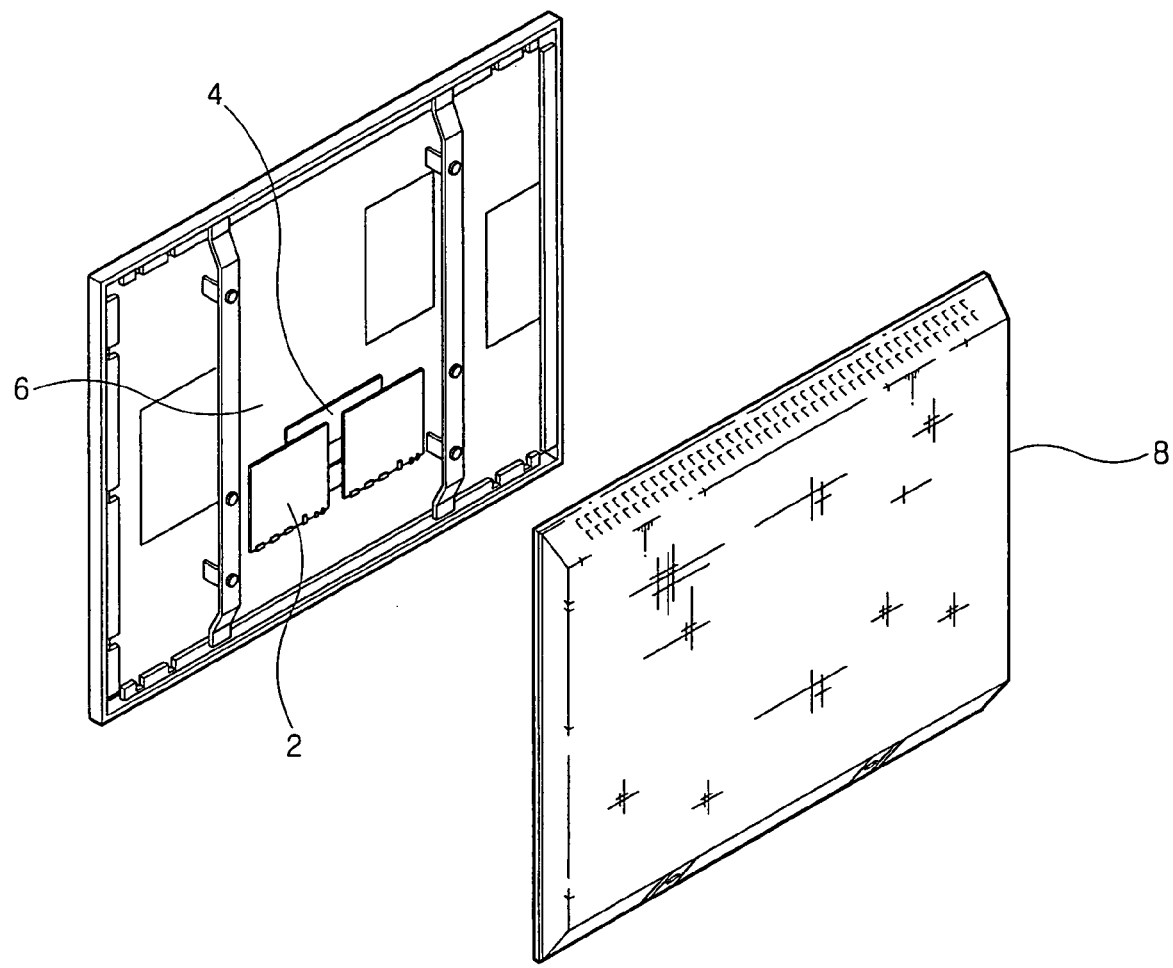
FIG. 1 illustrates an installation arrangement of a video board and various circuit components in a conventional display apparatus.

Reference will now be made in detail to embodiments of the present invention, examples of which are illustrated in the accompanying drawings, wherein like reference numerals refer to the like elements throughout. The embodiments are described below to explain the present invention by referring to the figures.

Figure 2:
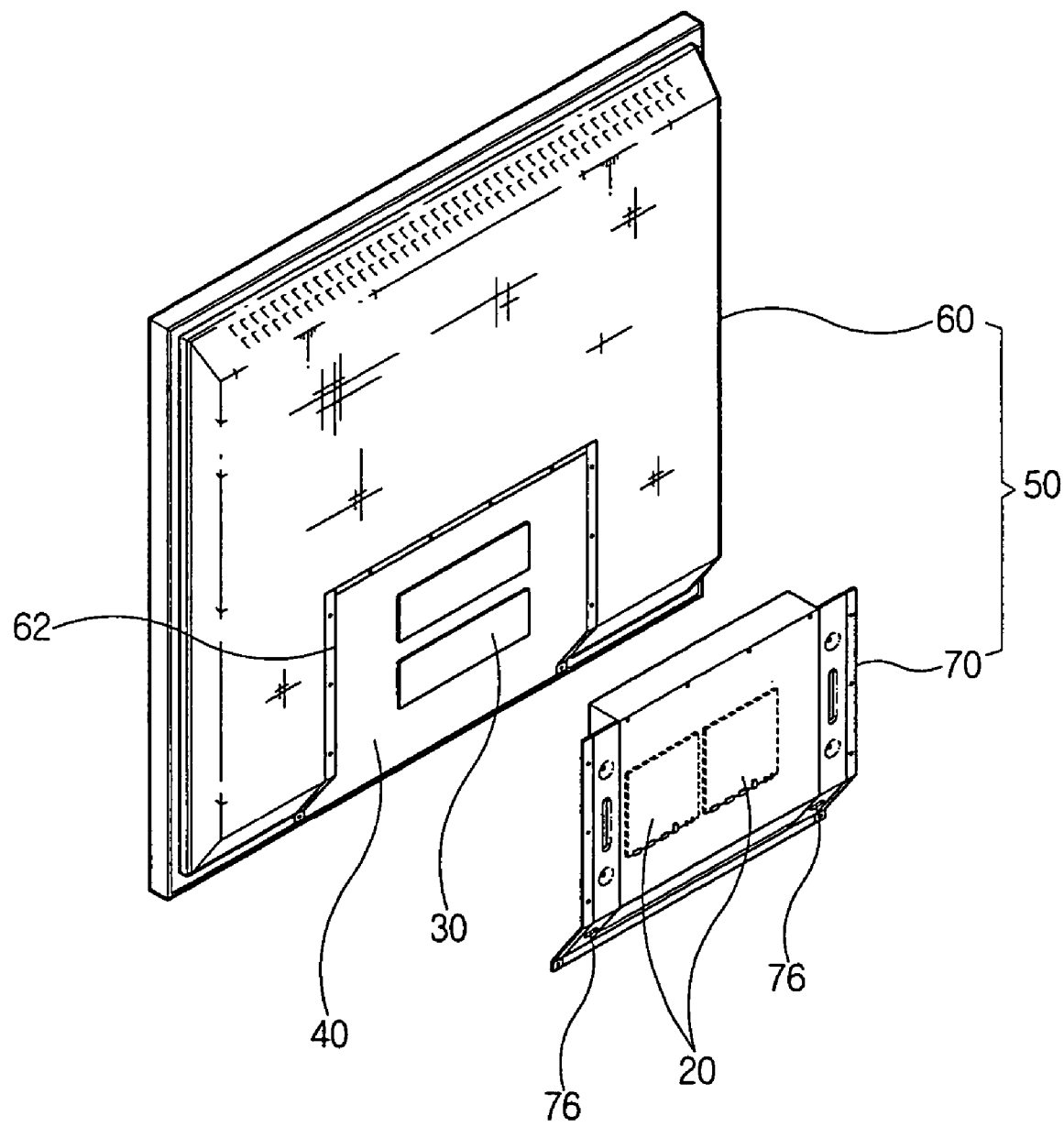
FIG. 2 illustrates an exploded perspective view of a display apparatus according to an embodiment of the present invention.
Figure 3:
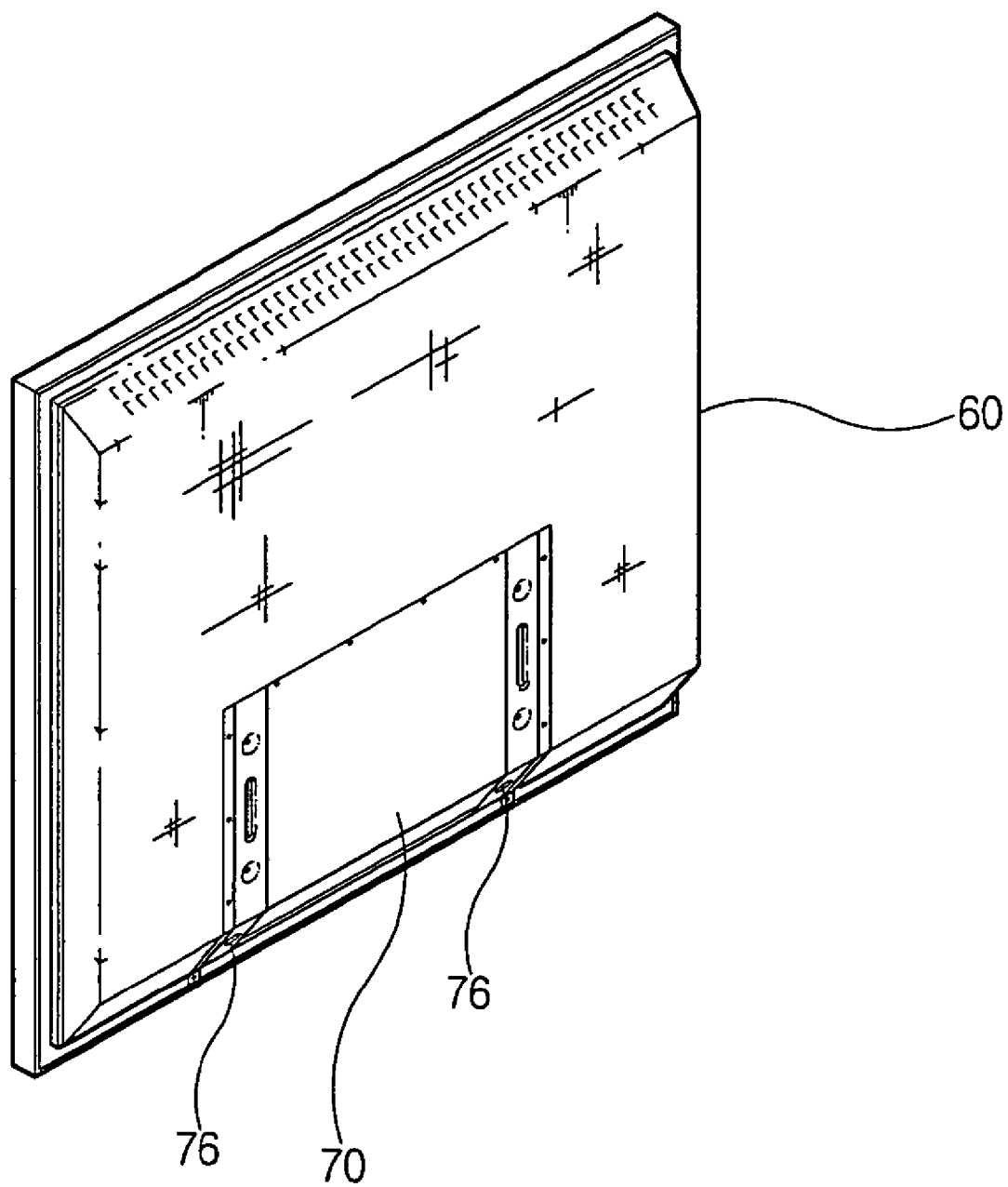
FIG. 3 illustrates a perspective view of the display apparatus of FIG. 2.
Figure 4:
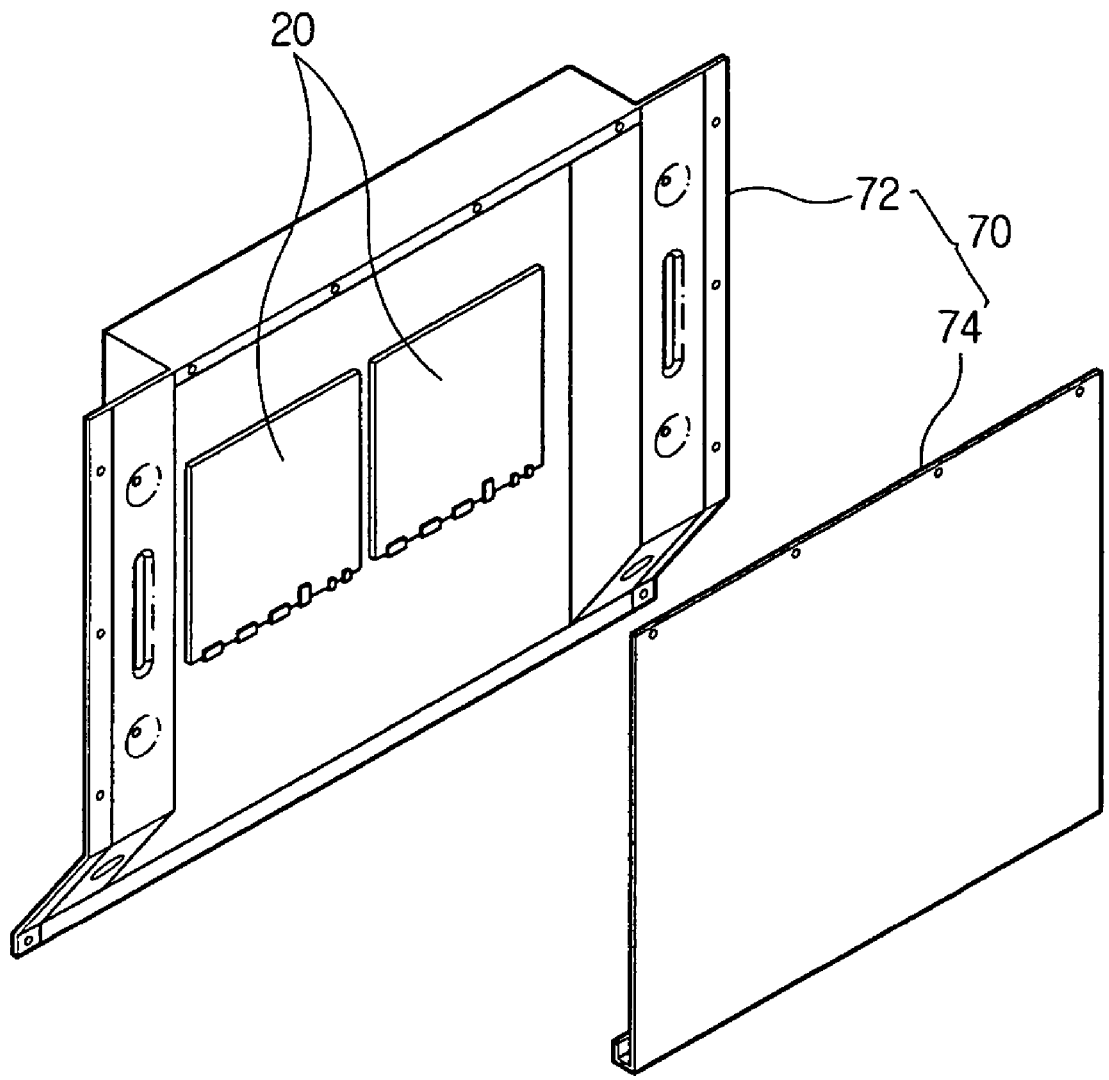
FIG. 4 is an exploded perspective view of a sub-case of the display apparatus of FIG. 2.

As shown in FIGS. 2 through 4, a display apparatus according to an embodiment of the present invention comprises: a base board 40, on which a tuner-mounted video board 20 and electronic circuit components 30 are electronically connected to each other; and a back case 50 combined to the base board 40, and including a main case 60 and a sub-case 70, which protect the video board 20 and the electronic circuit components 30.

The video board 20 performs image-processing, and may be analog or digital. A tuner, mounted in the video board 20, is a device for tuning, especially an electronic circuit or device used to select signals at a specific radio frequency. But the tuner can decrease a picture quality because of a sustain noise generated by electromagnetic interference between the video board 20 and the electric circuit components 30.

The back case 50 comprises the main case 60 covering the electric circuit components 30, such as a signal board, and the sub-case 70, mounted with the video board 20 and detachably combined with the main case 60. According to one aspect, the main case 60 and the sub-case 70 are made of materials that block electromagnetic waves.

A docking area 62 accommodating the sub-case 70 is provided at a rear of the main case 60. When the sub-case 70 is detached from the main case 60, the docking area 62 allows, for example, upgraded after-sales maintenance of the electric circuit components 30, which are normally covered by the sub-case 70.

The sub-case 70 comprises a shield plate 72 engaged with the main case 60 and preventing the video board 20 from having occasional electromagnetic interference with the electric circuit components 30, and a bracket terminal 74 combined to the shield plate 72 preventing outward leakage of electromagnetic waves from the video board 20. The bracket terminal 74 is detachably installed to the shield plate 72, and allows prompt and convenient maintenance by detaching the bracket terminal 74 from the shield plate 72 when troubles occur in the video board 20.

The structure of the sub-case 70 can be changed as necessary, as long as the sub-case 70 prevents electromagnetic interference between the electric circuits components 30 covered by the sub-case 70 and the video board 20.

The sub-case 70 further comprises a stand connection part 76, to which a stand (not shown) is connected, so that the sub-case 70 in connection with the stand can be detached from the main case 60. Considering the shape of the back case 50, in addition, according to one aspect, the sub-case 70 is fitted in the main case 60, not to protrude from a rear of the main case 60.

As described above, a display apparatus according to the present invention provides a high quality of a picture image, that prevents a sustain noise by blocking electromagnetic interference between the video board the and electric circuit components.

The display apparatus also provides for convenient after-sale maintenance and upgrade of the video board and the electric circuit components.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus, comprising:
    a base board in which a tuner-mounted video board and electronic circuit components are electrically connected; and
    a back case, connected to the base board and protecting the video board and the circuit components, the back case comprising
    a main case connected to the base board, and
    a sub-case detachably connected to the main case, mounted with the video board, and blocking electromagnetic interference between the video board and the electronic circuit components,
    wherein the electronic circuit components are mounted on the base board and exposed to an outside while the sub-case is not connected to the main case.

2. The display apparatus according to claim 1, wherein the sub-case comprises:
    a shield plate combined with the main case and blocking electromagnetic interference between the video board and the electronic circuit components; and
    a bracket terminal combined to the shield plate, preventing electromagnetic waves from the video board from leaking out.

3. The display apparatus according to claim 1, wherein the main case is provided with a docking area with which the sub-case is detachably combined.

4. The display apparatus according to claim 3, wherein the sub-case comprises:
    a stand connection part, to which a stand is connected, allowing the sub-case to be detached from the main case, and remain in connection with the stand.

5. The display apparatus according to claim 2, wherein the main case is provided with a selectively opened docking area, with which the sub-case is detachably combined.

6. The display apparatus according to claim 5, wherein the sub-case further comprises:
    a stand connection part, to which a stand is connected, allowing the sub-case to be detached from the docking area, and remain in connection with the stand.

7. The display apparatus according to claim 1, wherein the sub-case is combined to the main case, not to protrude from a rear of the main case, to provide a convenience for mounting the display apparatus on a wall.

8. A display apparatus, comprising:
    a base board, on which a tuner-mounted video board and electronic circuit components are electrically connected to each other;
    a main case connected to the base board; and
    a sub-case, detachably connected to the main case, that prevents electromagnetic interference between the video board and the electronic circuit components,
    wherein the electronic circuit components are mounted on the base board and exposed to an outside while the sub-case is not connected to the main case.

9. The display apparatus according to claim 8, wherein the video board is mounted on the sub-case.

10. The display apparatus according to claim 8, wherein of the sub-case and the main case, at least the sub-case is made of material that blocks electromagnetic waves.

11. The display apparatus according to claim 8, wherein the main case comprises:
    a docking area detachably accommodating the sub-case.

12. The display apparatus according to claim 8, wherein the sub-case comprises:
    a shield plate, detachably connected to the main case, and preventing electromagnetic interference between the video board and the electronic components; and
    a bracket terminal, connected to the shield plate, and preventing leakage of electromagnetic waves from the video card.

13. The display apparatus according to claim 8, wherein:
    the display apparatus further comprises a stand; and
    the sub-case comprises a stand connection part, detachably connected to the stand, such that the sub-case can be detached from the main case and remain connected to the stand.

14. The display apparatus according to claim 8, wherein when the sub-case is connected to the main case, and the sub-case does not protrude from the main case, to provide a convenience for mounting the display apparatus on a wall.

15. A video board connecting device for a display apparatus, including a main case, a video board, a base board and electronic circuit components, the connecting device comprising:

a sub-case, housing the video board, detachably flush mounted to the main case to provide a convenience for mounting the display apparatus on a wall, electrically connecting the video board to the electronic circuit components, and preventing electromagnetic interference between the video board and the electronic circuit components, wherein the main case is connected to the base board, and the electronic circuit components are mounted on the base board and exposed to an outside while the sub-case is not connected to the main case.

* * * * *